May 28, 1968
R. C. LARSON
3,385,520
AUTOMATIC TEMPERATURE RESPONSIVE CONTROL VALVE
Filed Feb. 4, 1966
2 Sheets-Sheet 1
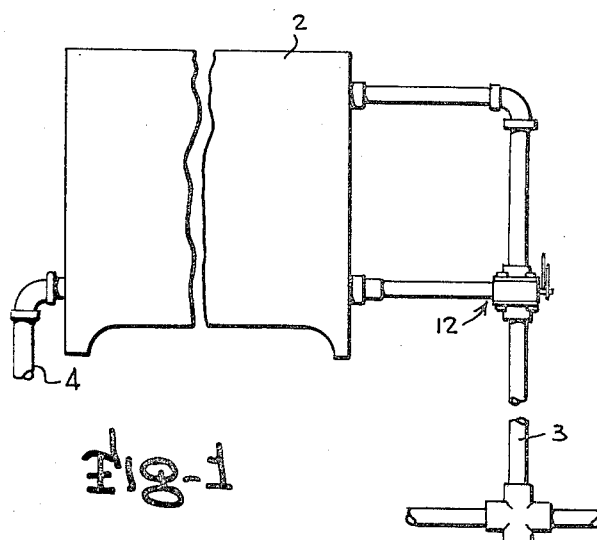
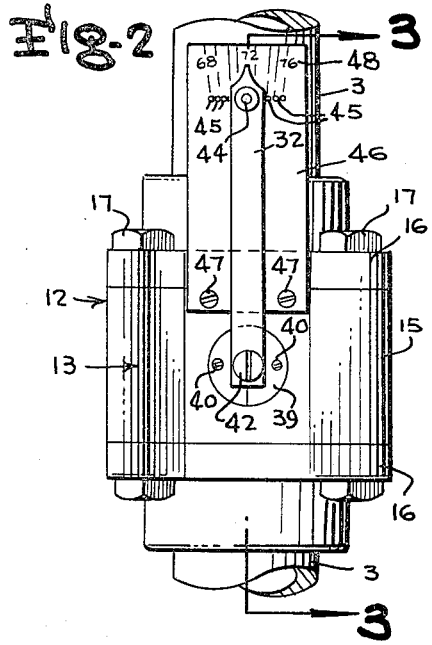
INVENTOR
RICHARD C. LARSON
BY Mason, Fenwick & Lawrence
ATTORNEYS

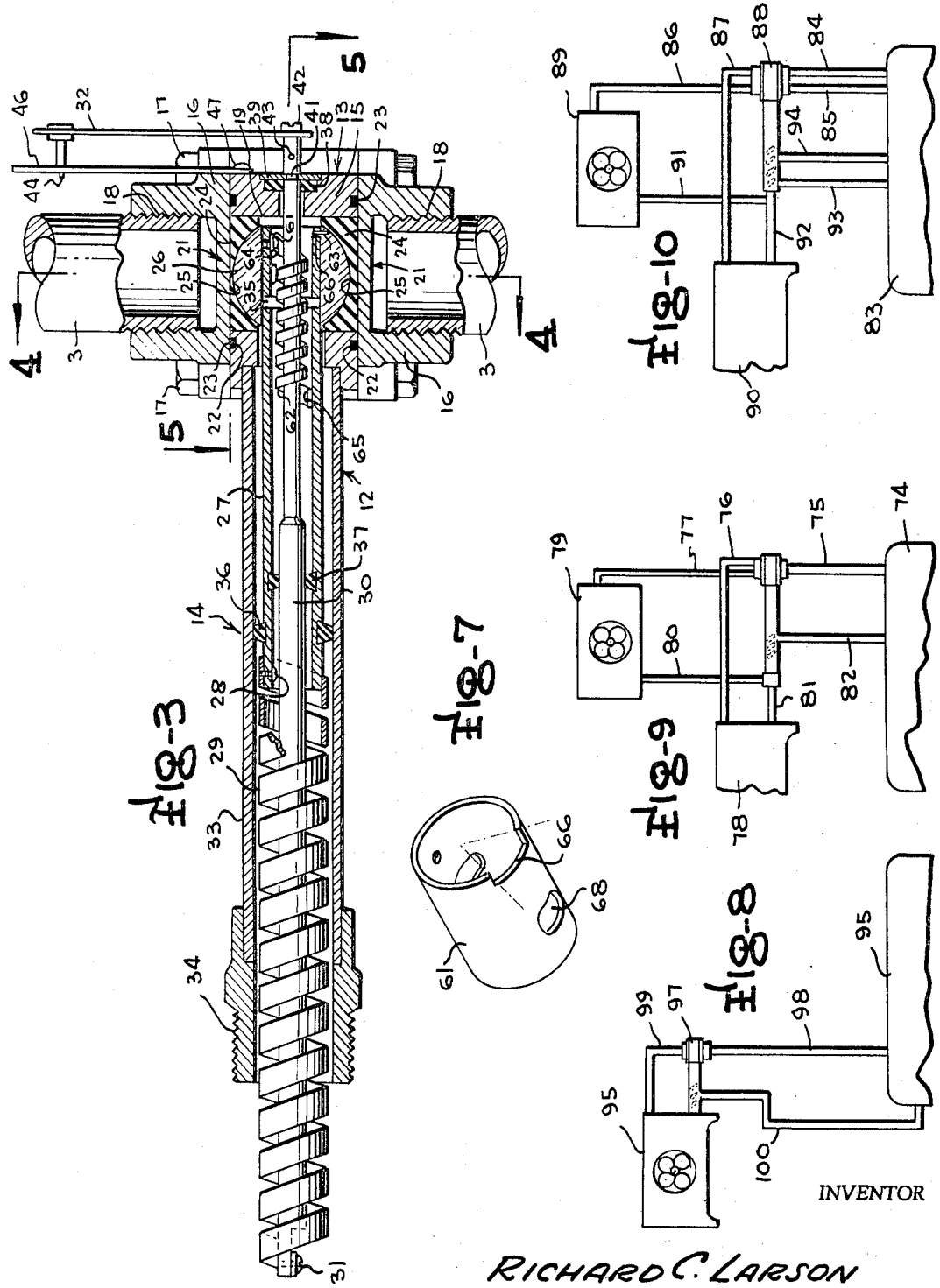

United States Patent Office 3,385,520
Patented May 28, 1968

3,385,520
AUTOMATIC TEMPERATURE RESPONSIVE CONTROL VALVE
Richard C. Larson, 4420 Great Oak Road, Rockville, Md. 20853
Filed Feb. 4, 1966, Ser. No. 525,057
9 Claims. (Cl. 236—1)

ABSTRACT OF THE DISCLOSURE

Automatic temperature responsive control valve for use with both heating and cooling fluids, wherein the valve has a rotatable ported ball turned by a helical thermostat in accordance with radiator and room demands for a set temperature. There is a sleeve valve carried by the ball for limited independent rotation relative to the ball in response to changes in the temperature of fluid passing through the valve to open for use selected ports in the ball for heating or cooling.

---

This invention relates to radiator control valves for use in combination heating and cooling systems, and is an improvement over the radiator control valve for combination systems, disclosed in my prior Patent No. 3,125,292, issued Mar. 17, 1964.

Current engineering practice shows that the emphasis in systems design is to total climate conrtol. Eighty-five percent of 1965 heating projects have but one system for heating and cooling. Also, factory assembly of these combination systems in contrast to field-erection shows continuing acceptance. The trend is for automatic operation of these units, especially for the smaller sizes. Some factory assembled systems and quite often the field erection systems require only manual operation in the switching from heating to cooling and vice-versa. Although some combination heating and cooling systems use air as the transfer medium, fluid transfer systems are the more important. A temperature control radiator valve with automatic switchover from heating to cooling and from cooling to heating has not ben available for combination fluid heating and cooling systems wherein individual room control is needed or useful, and the unit of the above-mentioned patent, while operating automatically for cooling or heating must be manual charged from one operation to the other.

It is the general object of the present invention to provide a radiator valve which automatically and continuously controls the amount of fluid entering a radiator in accordance with room requirements for both heating and cooling fluids; and, when used with a combination heating and cooling system which is regulated by outdoor temperatures, the entire system including the switching from heating to cooling and vice-versa is automatic.

A more specific object is the provision of such a system wherein a packaged combination heating and cooling unit control is by means of an outdoor temperature responsive device, and wherein the radiators are controlled by valves automatically responsive to radiator spent fluid and room air temperature, and wherein the incoming heating fluid sets the valve for heating modulation and the incoming cooling fluid sets the valve for cooling modulation.

Another object is to provide a valve for radiators having improved temperature responsive control means for both heating and cooling.

A further object is the provision of an improved automatic valve having temperature responsive control means which is non-electric, and having temperature responsive control means for setting the valve on heating or on cooling according to the fluid supplied to the valve in a non-electric manner.

Still another object of the present invention is to provide a valve which can be set at a prescribed temperature and which setting governs both the automatic control of the heating and of the cooling of the radiator and room, and in which the switching from heating to cooling and vice-versa is thermostatically accomplished by the fluid entering the radiator through the valve.

It is also an object of this invention to provide a valve for the commercially available combination heating and cooling systems and for the field erected and combined commercial heating and cooling systems wherein individual room temperatures are maintained at preselected values when outdoor temperatures change as summer turns to winter, as hot days turn to cold nights, and as hot hours turn to cold hours solely by means of outdoor temperature responsive devices and by thermostatic responsive devices within the valve.

A further object is to provide the above type of control unit for use in a dual radiator system, such as a baseboard radiator for steam or hot water on the level of the floor and a fan radiator type of cooling unit on a higher level or in the ceiling.

Still another object of the invention is to provide a non-electric control valve responsive to temperature changes, which can be pre-set to be responsive at selected temperatures in quantity of fluid modulation for both heating and cooling, which setting can be quickly changed when desired.

Other objects of the invention will become apparent from the following description of practical embodiments thereof, when taken in conjunction with the drawings which accompany, and form part of, this specification.

In the drawings:

FIGURE 1 is a somewhat schematic view illustrating the control to a fluid heating and cooling system including a heater-cooler combination unit and at least one radiator, with an automatic control valve of the present invention in the system;

FIGURE 2 is an end view of the automatic control valve, shown on an enlarged scale;

FIGURE 3 is a vertical, longitudinal section through the valve, taken on the line 3—3 of FIGURE 2;

FIGURE 4 is a vertical, transverse section through the valve, taken on the line 4—4 of FIGURE 3;

FIGURE 5 is a horizontal section through the valve body, and is taken on the line 5—5 of FIGURE 3;

FIGURE 6 is a vertical section through an alternate form of cap for the valve body;

FIGURE 7 is a perspective view of a sleeve valve used for switching the control valve from heating to cooling operation;

FIGURE 8 shows schematically a heating and cooling system employing a different type radiator;

FIGURE 9 shows another system, this one including a dual radiator arrangement controlled by a single automatic control valve; and FIGURE 10 is still another dual radiator system.

In general, the invention contemplates the provision of independent valve control means at each radiator in a system which can supply either heating or cooling fluid, which valve control means is responsive to air and radiator temperatures. The valve is an improved valve of the rotary type and automatically re-sets itself as the fluid conditioner switches from heating to cooling and vice-versa. It is controlled by thermally responsive mechanical means, and can be pre-set to open and close the valve at predetermined temperature for both heating and cooling. The action of the valve during either heating or cooling is not a step by step operation, or a simple open and close arrangement, but one wherein the valve opens and closes by continuous progression.

Referring to the drawings in detail, and first adverting to FIGURE 1, there is shown a combination heating and cooling system 1, which is called a fluid conditioner, and may be electrical, or gas or oil fired, one or more radiators 2 of standard types, and a piping system having pipes 3 leading from the fluid conditioner to the radiators and the return lines 4. The system may operate with hot or cold fluid.

The baseboard radiator 2 shown is merely illustrative of any conventional type. Irrespective of the type of radiator used, it will be controlled by a valve 12 interposed in the line feeding the radiator. The valve is automatically controlled, and re-set according to the temperature of the conditioning fluid entering the valve from pipe 3. It will have its control body inserted partially into the spent fluid and partially exposed to circulating room air. Thus the valve will operate as required by changes in room air temperature, radiator temperature, or both; and by changes in incoming fluid temperature.

With the system just described, the fluid conditioner 1 will function to maintain an energy output (either heating fluid or cooling fluid) at that degree predetermined for the particular outside temperature.

The valves 12, which control the radiators, shown in detail in FIGURES 2 to 5 and 7, each includes a valve body 13 and a rate control body 14 which projects outwardly from the valve body.

The valve body 13 has a three-part housing comprising a hollow central member 15 and cap plates 16 on opposite ends of the central member. Bolts 17 hold the housing elements together. Each of the caps has a central, threaded passage 18 for connecting the valve body in the conditioning system line, so that the conditioning fluid will flow through the housing when the valve is open. The central member has a cylindrical inner chamber 19 through its full height, and the caps have inwardly directed flanges 20 which overlie portions of the chamber 19 in the central member. Openings 21 are defined by the flanges 20 of the caps, and provide passages to and from the chamber 19 through the pipes 3 threaded into the caps. The openings 21, the passages 18 and the chamber 19 are in connective relation. The central member may be rabbeted around its opposite inner edges to provide grooves 22 to receive sealing gaskets 23 against which the cap members bear to prevent seepage of fluid between the central member and cap plates.

Valve seats 24 are fitted within the ends of the chamber 19 and rest against the overhanging flanges of the cap plates. It is contemplated that the valve seats will be self-lubricating plastic members, of material such as Teflon. The inner sides of the members are provided with seating surfaces 25 of spherical curvature to seat a valve ball 26. The valve ball and its particular structure will be described later. The length of the chamber 19 in the central member is such that when the ball is in place, the valve seats in engagement with the ball, and the cap plates in position, the ball will be firmly held against the spherical seats, yet free to adjust itself to the seats and rotate about its horizontal axis.

The ball 26 is fixed to one end of a tube 27, the other end being attached, as at 28, to a helically wound, bi-metallic, thermostatic element 29 which is attached in turn to the outermost end of a stem 30, as at 31. Stem 30 carries a temperature setting arm 32 at its other end.

Tube 27 and element 29 extend coaxially through a tubular casing 33 which is carried by the central member and forms the housing of the rate control body 14. The free end of casing 33 is open and threaded, as at 34, so that it can be screwed into a radiator. Element 29 and stem 30 extend beyond the open end of casing 33 to project into the spent fluid space within the radiator. Ball 26 has a diametrical bore 35 of sufficient diameter to receive tube 27. Ball 26, tube 27, element 29, and stem 30 rotate about a common axis which is the longitudinal axis of casing 33 and central valve body member 15. Their alignment is fixed by means of valve seats 24 and ring gaskets 36, 37 and 38. A two-piece retainer ring 39, which is fixed to the central member 15 by screws 40, houses gaskets 38 and fits into a peripheral groove 41 on stem 30, locking stem 30 in position while allowing it rotational motion with respect to casing 33, whenever spring arm 32 is flexed outwards.

Arm 32 is fixed on stem 30 by means of a screw 42, which threads into the tapped end of stem 30. When screw 42 is loosened, stem 30 can be rotated by means of a round bar inserted in hole 43, which is drilled through stem 30, while arm 32 remains in a stationary position due to a pin 44, which is riveted into arm 32, engaging one of a plurality of holes 45 in a plate 46, fixed to the valve control member 15 by screws 47. The holes 45 are in a temperature setting scale 48. This adjustment permits temperature calibration of thermostatic element 29 and the scale 48.

When screw 42 is in place, and spring arm 32 is freed by outward flexing of the arm, the operating temperature of valve 12 can be chosen by moving the free end of the arm across the scale 48. Release of the spring arm will allow pin 44 to engage in the hole 45 of plate 46 at the selected temperature.

The ball 26 has passages 49 and 50, which extend diametrically through the ball and lie in a common transverse, vertical plane which is at right angles to the bore 35, to provide ports 51, 52, 53 and 54, at the surface of the ball for the passage of fluid through the valve when the ball is rotated so that the ports are aligned with the openings 21 in the cap plates 16. For purposes of disclosure, it may be assumed that the passages and ports of the ball are round. These will be similar in shape to passages 55 and 56 of valve seats 24 and passages 57 and 58, which together form the openings 21 to and through the cap plates. Locating pins 59 may be used to align the valve seats with the cap plates to assure proper registry of the respective passages. Rotation of ball 26 will bring its ports into, or out of, registry with the respective passages in the valve seats, as will be described in detail, to control flow of fluid through pipe line 3 to the radiator.

When the valve is in use, one of the passages through the ball will serve as the valve port when cooling fluid is flowing through pipe 3, and the other passage through the ball will serve as the valve port when heating fluid is in the pipe line. The proper port is chosen automatically by means of a change-over control means 60.

Change-over control 60 is carried partially within bore 35 of ball 26 and partially within tube 27. It consists of three parts, a sleeve valve 61, a helically wound bi-metallic thermostatic element 62 and a stop pin 63. One end of thermostatic element 62 is within sleeve valve 61 and is attached to the sleeve valve as at 64 (FIG. 3). The other end is within tube 27 and is attached to the tube as at 65. The change-over control is so constructed and assembled that element 62 rotates sleeve valve 61 clockwise (as viewed in FIG. 4) upon a temperature rise, and counterclockwise upon a temperature fall. This will change the position of the sleeve valve with respect to ball 26. Pin 63 is set into ball 26 so that it extends into bore 35 and into a notch 66 in one edge of sleeve valve 61 to restrict rotation of the sleeve valve to an angle equal to the angle between the passages 49 and 50 in ball 26. The sleeve valve has diametrically opposed ports 67 and 68, and the sleeve valve movement is limited by pin 63 and notch 66 so that in one position ports 67 and 68 will be in registry with ball passage 49, and in the other position the sleeve valve ports will be in registry with ball passage 50. When the sleeve valve is in either of its positions it will maintain its position relative to ball 26 because the change-over unit is carried by sleeve 27 and ball 26 and move with them.

No calibration is necessary for bi-metallic element 62 since it is constructed so that it will rotate sleeve valve 61 clockwise until one shoulder of notch 66 is hard against pin 63 for all temperatures of heating fluid used in the system, and will rotate the sleeve valve counterclockwise until the other shoulder of notch 66 is hard against pin 63 for all temperatures of cooling fluid used in the system.

The construction and calibration of bi-metallic thermostatic element 29, ball 26, temperature setting arm 32 and its scale 48 are such that when element 29 is held constant temperaturewise to any temperature appearing on scale 48 aligned with the tip of arm 32, the four ports 51, 52, 53 and 54 on the surface of ball 26 will be half covered by valve seats 24.

In mounting the valve, the threaded end 34 of casing 33 is screwed into the radiator so that the interior of the casing is in communication with the fluid in the radiator, but more importantly, so that the exposed end of the helical bi-metallic thermostatic element 29 lies in the spent fluid in the body of the radiator. The pipes 3 are connected to the valve cap plates 16 so that the flow of fluid to the radiator is through the valve and in contact with the helical bi-metallic thermostatic element 62.

When the system is to be used, adjusting arm 32 will be turned to the temperature scale 48 setting indicated for the desired room temperature, and this one setting will control both heating fluid and cooling fluid. Such movement will cause rotation of stem 30 and, through the stem, the helical thermostat 29, the tube 27 and the valve ball 26. Thus setting the arm will in turn set the position of the four ports 51, 52, 53 and 54 in relation to the edges of the passages 55 and 56 in valve seat 24.

Assuming that the system is in operation with heating fluid being supplied by unit 1 and the room temperature is at the desired level, the valve will be in mean operating position and the ports 51, 52, 53 and 54 will have their areas reduced one-half by valve seats 24. Ports 67 and 68 of sleeve valve 61 will be in register with ports 51 and 53 of ball 26, and ports 52 and 54 will be closed by the sleeve valve. The valve is now operating in low-level linear fluid quantity modulation.

The ball 26 responds instantaneously to changes in the helical, bi-metallic element 29 temperature by both clockwise and counterclockwise rotational increments, since the helix is in a temperature tensed condition. Its outer end is fixed, and there is no compliance between its inner end and ball 26. The depth of modulation is normally plus and minus two degrees Fahrenheit as the ports 51 and 53 are sized to represent a four degree temperature difference rotation of element 29. Beyond modulation, the valve ball openings are either biased toward cutoff (room too warm) or biased toward full openness (room too cold). The self contained modulation of the valve keeps the room at the desired temperature in the absence of changed conditions.

When there is a change, such as an outside temperature drop, two significant things happen: First, heating fluid energy (B.t.u./lb.) will be raised, so that the heat potential of the system will now be higher, and this, in effect re-sizes valve 12 to fit the now higher heat loss of the room; second, the mean operation position of the valve is disturbed by the increased heat loss of the room due to the outside temperature drop. As the room and radiator temperatures fall, the bi-metallic element 29 will be affected both by direct contact with the radiator spent fluid and by flow of room air across casing 33. This will cause unwinding movement of the helix 29, which imparts rotative movement to ball 26. This will cause ports 51 and 53 of the ball 26 to move across the valve seat edges to bias the valve to a more open position, and an increased quantity of fluid will flow through the valve into the radiator and warm the room. As the room temperature rises and rotative movement imparted to ball 26 becomes slower, stops and reacts in reverse to lessen the fluid flow, the ball will move into a mean operating position again and become modulating under the increased fluid temperature with the room at the desired temperature.

Now assume that the system is in operation and it is desired to raise the temperature of the room. Arm 32 is re-set to a higher temperature which will bias the ball 26 to move the ports to a more open position. The ports 51 and 53 will be out towards the center of the valve cap openings with which they communicate, and there will be more fluid flow through the valve and radiators to warm the room, the radiator and the bi-metallic thermostatic element 29. This generates winding movement at the inner end of the element 29 and rotates the ball 26 back into a mean operating position just as the room reaches the re-set temperature. The operation is reversed when it is desired to lower the room temperature.

When the system is in operation with cooling fluid and the room temperature is at the desired level, the temperature of the element 29 will be at room temperature, the valve will be in the mean operating position, and the four ports 51, 52, 53 and 54 will have their areas reduced one-half by valve seats 24 and the ports will be in mean operating position. Ports 67 and 68 of sleeve valve 61 will be in register with ball ports 52 and 54 and ball ports 51 and 53 will be closed by the sleeve valve. The valve is now operating in low-level-linear-fluid-quantity modulation.

The ball 26 responds instantaneously to changes in helical temperature by both clockwise and counterclockwise rotational increments since the helix is in a temperature tensed condition, its outer end is fixed, and there is no compliance between its inner end and ball 26. The depth of modulation is as described for heating fluid. Beyond modulation the valve ball openings are either biased toward cut-off (room too cold) or biased toward full openness (room too warm). The self contained modulation of the valve keeps the room at the desired temperature in the absence of disturbances.

When there is a change in condition, such as an outside temperature rise, two significant things happen. First, the temperature of the fluid will be dropped so that the fluid temperature of the system will now be lower, and this, in effect, re-sizes valves 12 to fit the now greater heat gain of the room. Second, the mean operation position of the valve is disturbed by the increased heat gain of the room due to the outside temperature rise. As the room and radiator temperatures rise, the bi-metallic element 29 will be affected both by direct contact with the radiator spent fluid and by flow of room air across casing 33. This will cause winding movement of the helix which imparts rotative movement to ball 26. The ports 52 and 54 of the ball will move across the valve seat edges to bias the valve to a more open position and an increased quantity of fluid will flow through the valve to the radiator and cool the room. As the room temperature drops, the rotative movement imparted to ball 26 becomes slower, stops and reacts in reverse to lessen the fluid flow and thus will move into a mean operating position again and become modulating under the lowered fluid temperature with the room at the desired temperature. Now assume that the system is in operation and it is desired to lower the temperature of the room. Arm 32 is re-set which will bias the port openings of ball 26 for more openness. Ports 52 and 54 will be out towards the center of the valve cap openings 56 and full fluid flow through the valve and radiators cools the room, the radiator and the bi-metallic thermostatic element 29. This generates winding movement at the inner end of the element 29 and rotates the ball 26 back into a mean operating position just as the room reaches the re-set temperature. The operation is in reverse when it is desired to increase the room temperature.

At any time desired the valve can be manually pre-set to obtain a particular room temperature. The pre-set changes the relative position of the ball four ports with respect to the valve seat passages so that when the thermal element reaches the chosen temperature the four ports middle and are between the close (no flow) position and the open (full flow) position.

The entire system can be switched from heating fluid to cooling fluid and vice versa, and valve 12 will function to maintain the room at the set temperature of scale 48.

When, upon temperature changes, the conditioning unit is switched from heating to cooling, or reverse, there will be a change from heating fluid to cooling fluid. The ball valve is designed so that there will never be a complete cut off of incoming fluid in the line and this will allow continuous contact of the change-over helix 62 with incoming fluid. Consequently, when the incoming fluid changes from heating fluid to cooling fluid the helix will respond to rotate the sleeve valve 61 through the full arc of movement permitted by the notch 66 and stop pin 63 so as to close the ports 51 and 53 of the heating fluid passage 49 in ball 26 and open the ports 52 and 54 of the passage 50. On a change from cooling fluid to heating fluid an opposite movement will take place.

Due to the fact that ports 51 and 53 act to open and close the valve seat passages 55 and ports 52 and 54 open and close valve seat passages 56, the two sets of ports will operate in opposite phase. In other words, ports 51 and 53 will open passages 55 upon a drop in temperature, whereas ports 52 and 54 open passages 56 upon a rise in temperature. This provides the reverse operation necessary for proper control with the two fluids.

The valve 12 can be modified so that it can be used in other systems than that described above. For example, a substitute cap plate 69 (FIGURE 6) may be used which has plural outlets 70 and 71, with the outlets forming continuations of the passages 72 and 73. These passages, of course, are the counterparts of passages 57 and 58 of the previously described form.

The modified cap plate will permit the valve to be used in plural radiator systems such as those shown in FIGURES 9 and 10. In FIGURE 9, the fluid conditioner unit 74 has a fluid feed line 75 connected to the bottom of the control valve as before. Dual lines 76 and 77, however, lead from the valve to a baseboard radiator 78 for heating, and an elevated radiator 79 for cooling. The spent fluid returns to the unit 1 through lines 80, 81 and 82. It will be noted that the inflowing fluid is in contact with the valve bottom to control the change-over, and the spent fluid is in contact with the ball-controlling helix.

In FIGURE 10, conditioning unit 83 has dual lines 84 and 85 for the two fluids, and two lines 86 and 87 carry the fluids from the valve 88 to the radiators 89 and 90. The return lines are shown at 91, 92, 93 and 94.

FIGURE 8 merely shows a slightly different radiator 95 from that of the system of FIGURE 1. Here, the conditioner unit 96 is connected to valve 97 by feed line 98, and the valve body is connected to the radiator by line 99. The return line is shown at 100.

With the system as described, a supply of heating or cooling fluid will be available to each radiator in accordance with the needs as dictated by outside temperatures. Each individual radiator will be controlled automatically in accordance with the needs of the area it serves. Any individual radiator may be re-set at any time as desired. The radiator valve adjusting automatically to heating fluid and to cooling fluid, being actuated by radiator spent fluid temperature as modified by room air temperature will react to maintain the room temperature at the desired temperature.

This valve can be used on dual systems other than those shown, and on single heating systems and on single cooling systems.

While in the above practical embodiments of the invention have been disclosed, it will be understood that the details of construction shown and described are merely by way of illustration and the invention may take other forms within the scope of the appended claims.

What is claimed is:

1. A temperature responsive valve comprising, a housing having fluid line connections at opposite ends, the housing having a central chamber and passages leading from the central chamber to the fluid line connections, a valve member rotatably mounted in the chamber and having a pair of passages diametrically therethrough and opening to the surface of the valve member to provide communication between the passages leading from the central chamber, the valve member passages being angularly related and lying in a single plane, means responsive to the temperature of spent fluid and room air to rotate the valve member, means movable to open and close successively and singly the individual passages through the valve member, and means responsive to the temperature of fluid flowing through the valve to shift the movable means from the open-closed relation to the closed-open relation of the passages through the valve member.

2. A temperature responsive valve as claimed in claim 1 wherein, there are means to limit the movement of the passage closing means to positions closing and opening the respective passages.

3. A temperature responsive valve as claimed in claim 1 wherein, the movable passage closing means and the means for shifting the passage closing means are carried by the valve member for bodily movement with the valve member.

4. A temperature responsive valve comprising, a housing having a means at opposite ends for connections to fluid lines, a pair of spaced opposed, valve seats within the housing, the seats having passages therethrough for communication with the fluid lines, a ball valve having its opposite sides seated in sealing relation in the valve seats, the ball having a pair of passages diametrically therethrough for registry with the passages through the valve seats, a helical, bi-metallic thermostat, a tube connected at one end to the ball and projecting therefrom, the tube having an opposite end connected to the end of the thermostat adjacent the ball, and a stem extending through the thermostat, tube and ball, the stem having one end fixed to the end of the thermostat remote from the ball and the other end fixed for rotational adjustment relative to the housing; and a second thermostat within the housing having one end connected to the tube and the other end connected to a rotatable sleeve valve having diametrically opposite ports for alignment with the opposite ends of the ball passages and having means providing rotational stops to register the sleeve valve ports with one passage through the ball and closing the other passage in alternation when the sleeve is rotated by said second thermostat.

5. A temperature responsive valve as claimed in claim 4, wherein the stem end fixed for rotational adjustment carries an adjusting arm, a temperature scale plate fixed to the housing, and means for releasably holding the arm in position of selected adjustment relative to the scale for control of both heating and cooling fluids.

6. A temperature responsive valve comprising, a housing having means at opposite ends for connection to fluid lines, a pair of spaced opposed, valve seats within the housing, the seats each having a pair of passages therethrough, a ball valve having its opposite sides seated in sealing relation in the valve seats, the ball having a pair of passages diametrically therethrough having open ends for registry with the passages in the valve seats, a helical bi-metallic thermostat, a tube connected at one end to the ball and projecting therefrom, the tube having an opposite end connected to an end of the thermostat adjacent the ball, and a stem extending through the thermostat, tube and ball, the stem having one end fixed to the end of the thermostat remote from the ball and the other end fixed for rotational adjustment relative to the housing, a second helical bi-metallic thermostat within the tube and having one end connected to the tube, a cylindrical sleeve valve rotatable within the ball and connected to the opposite end of said second thermostat, ports located diametrically opposed in the sleeve in the plane of the ports in the ball, and means to limit rotation of the sleeve within the ball under the influence of said second thermostat to alternate registration with the diametrically opposed pairs of ports in the ball.

7. A temperature responsive valve as claimed in claim 6 wherein, the means to limit rotation of the sleeve includes a notch in the sleeve and a pin in the ball and projecting into the sleeve notch.

8. A temperature responsive valve as claimed in claim 6 wherein, the means for connection to fluid lines includes a pair of passages at each end of the housing in open communication with the respective passages in the adjacent valve seats, whereby hot and cold fluids may be run by separate lines through the valve.

9. A temperature responsive valve as claimed in claim 6 wherein, when the valve is connected to fluid lines, the first-mentioned thermostat is responsive to spent fluid and room temperature, and the second thermostat is responsive to incoming fluid temperatures, whereby the sleeve valve will be rotated relative to the ball when the incoming fluid changes from heating fluid to cooling fluid and from cooling fluid to heating fluid, and the ball and the sleeve valve will rotate as a unit under changes in spent fluid temperature and room temperature.

References Cited

UNITED STATES PATENTS

| 2,628,032 | 2/1953 | Copping | 236—1 |
| 2,776,796 | 1/1957 | Mosley | 236—1 |
| 3,132,804 | 5/1964 | Larson | 236—101 |

EDWARD J. MICHAEL, *Primary Examiner.*